May 20, 1958 G. C. REISER ET AL 2,835,129
SPRING TESTING DEVICE
Filed Sept. 29, 1955 7 Sheets-Sheet 1
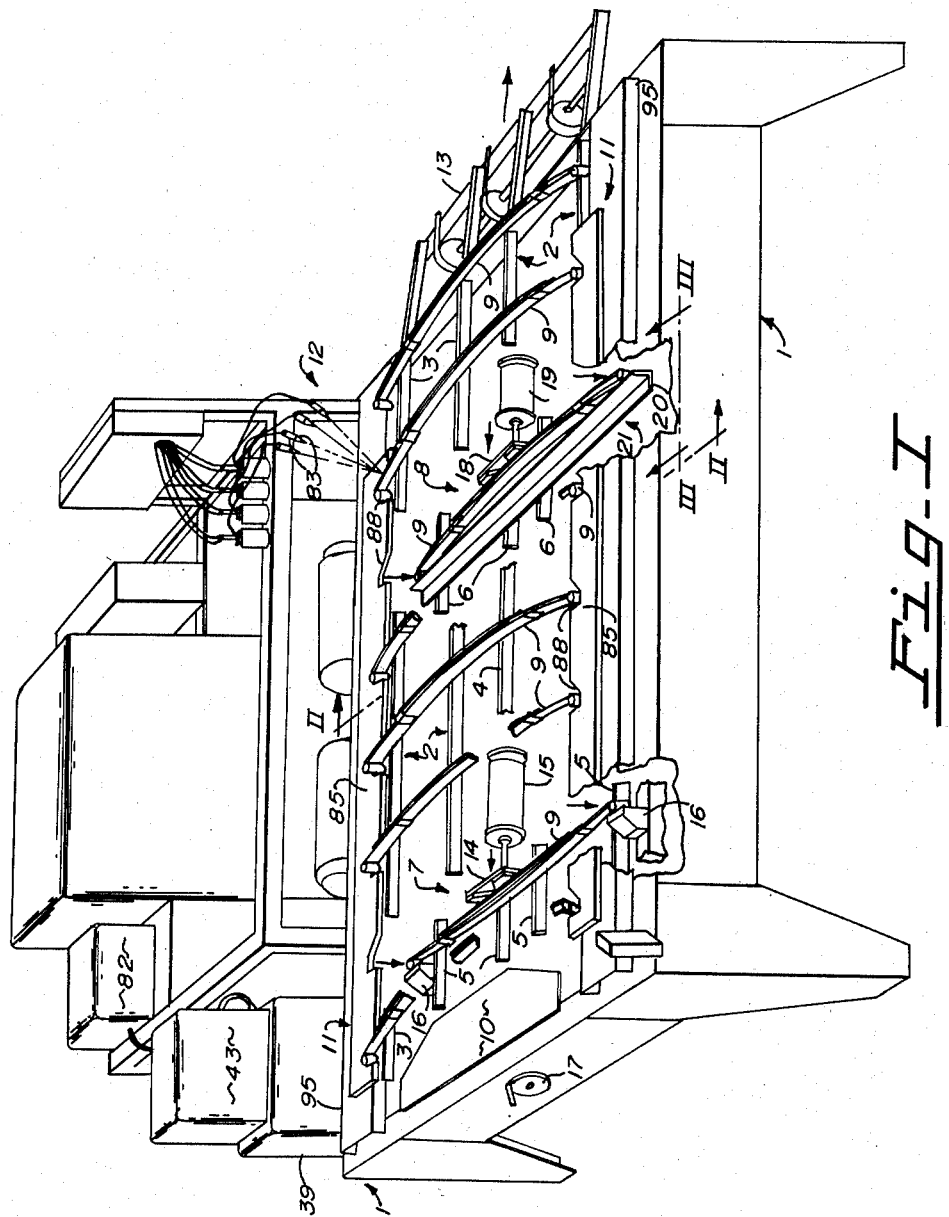
INVENTORS
GEORGE C. REISER
KENNETH F. WETZEL
BY
Marshall, Marshall & Yeasting
ATTORNEYS May 20, 1958
G. C. REISER ET AL
2,835,129
SPRING TESTING DEVICE
Filed Sept. 29, 1955
7 Sheets-Sheet 2
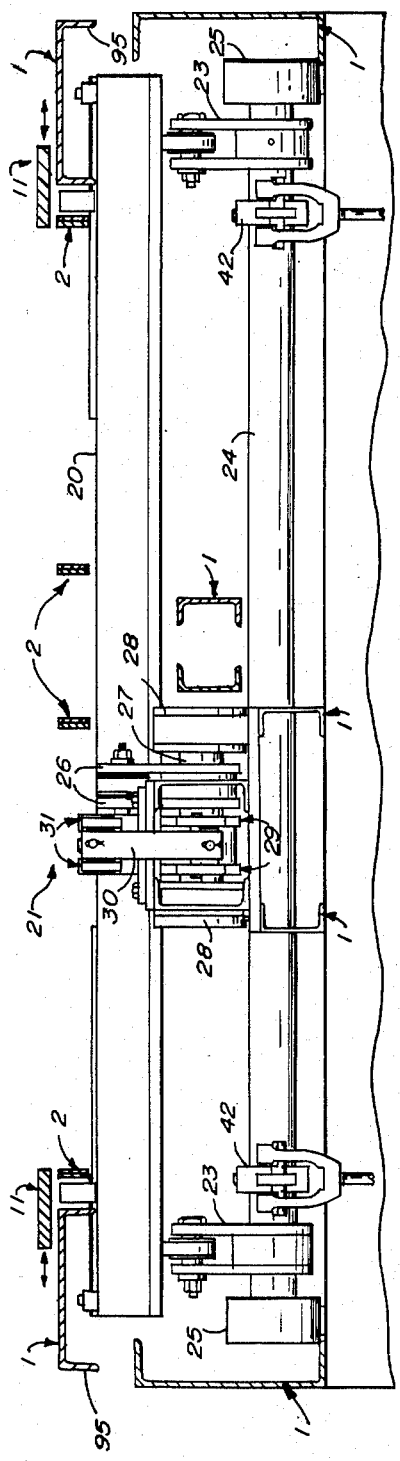
Fig. II
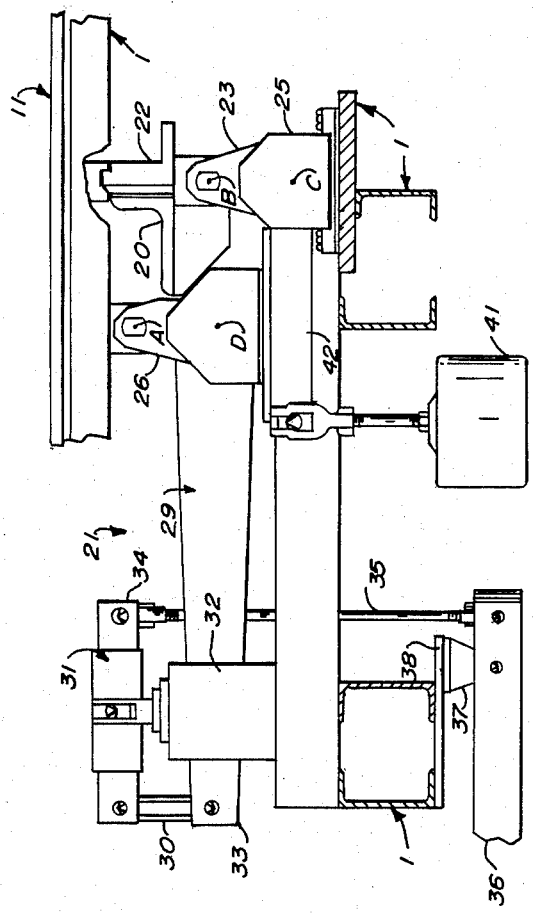
Fig. III
INVENTORS
GEORGE C. REISER
KENNETH F. WETZEL
BY
Marshall, Marshall & Guesting
ATTORNEYS

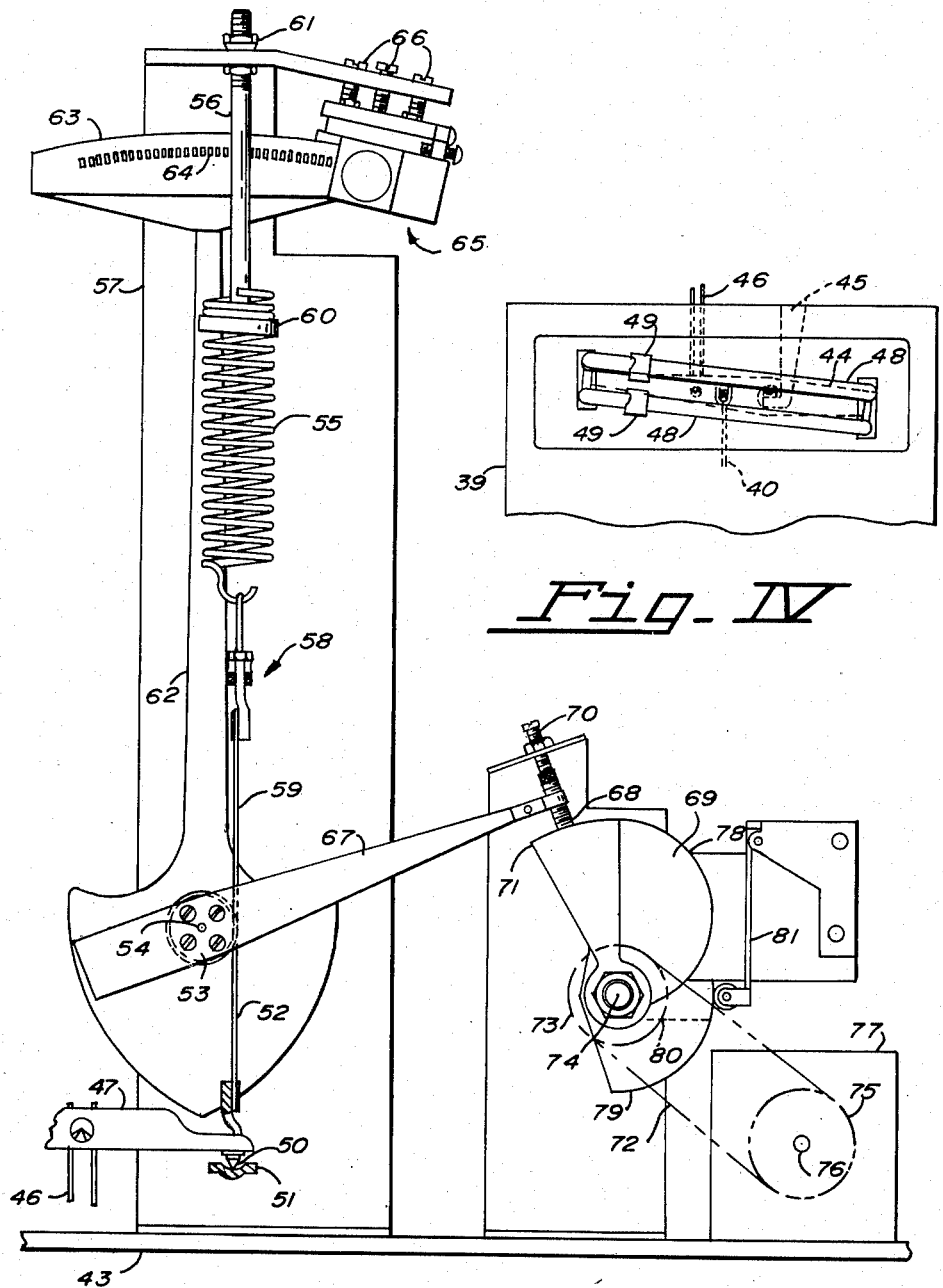

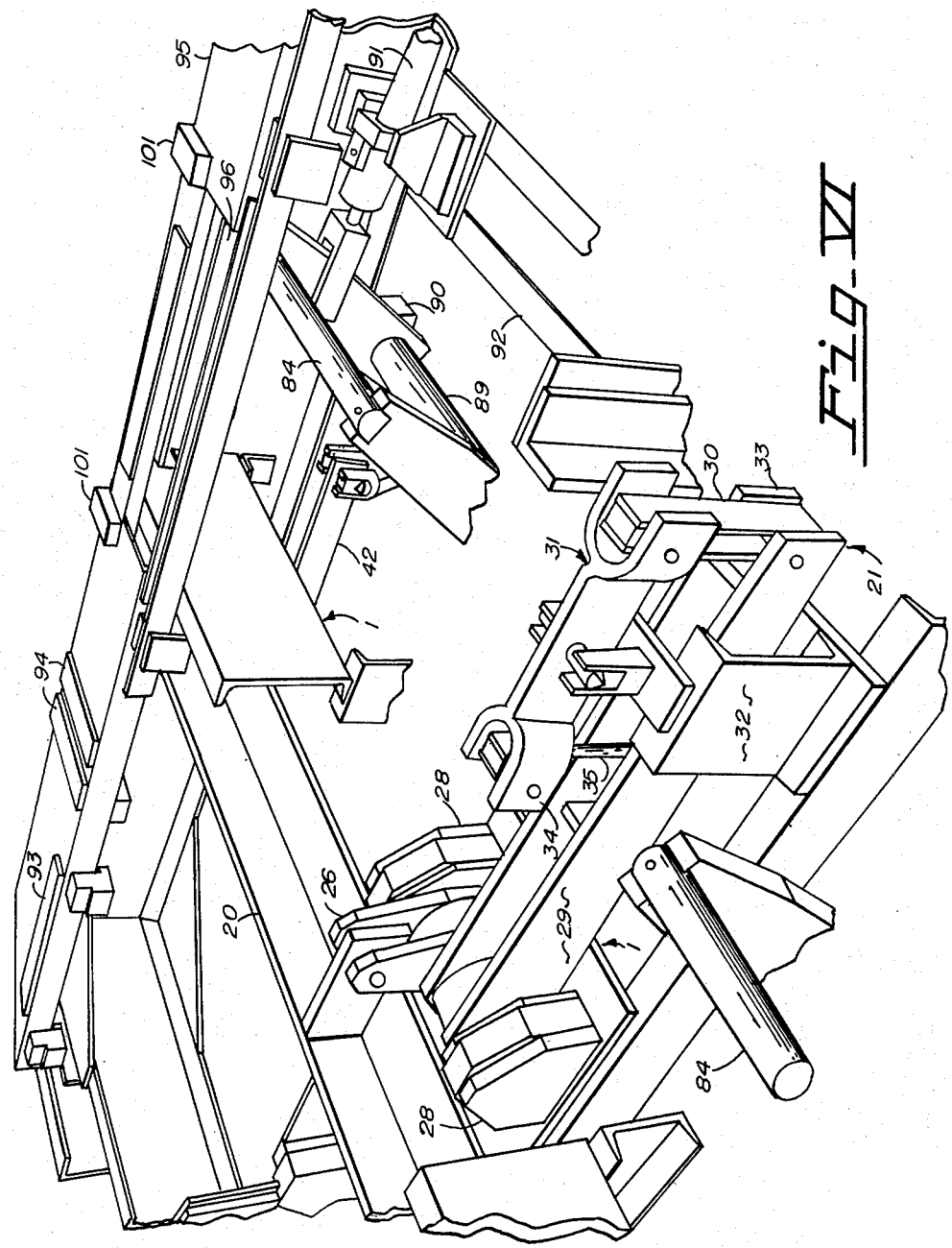

May 20, 1958
G. C. REISER ET AL
2,835,129
SPRING TESTING DEVICE
Filed Sept. 29, 1955
7 Sheets-Sheet 5
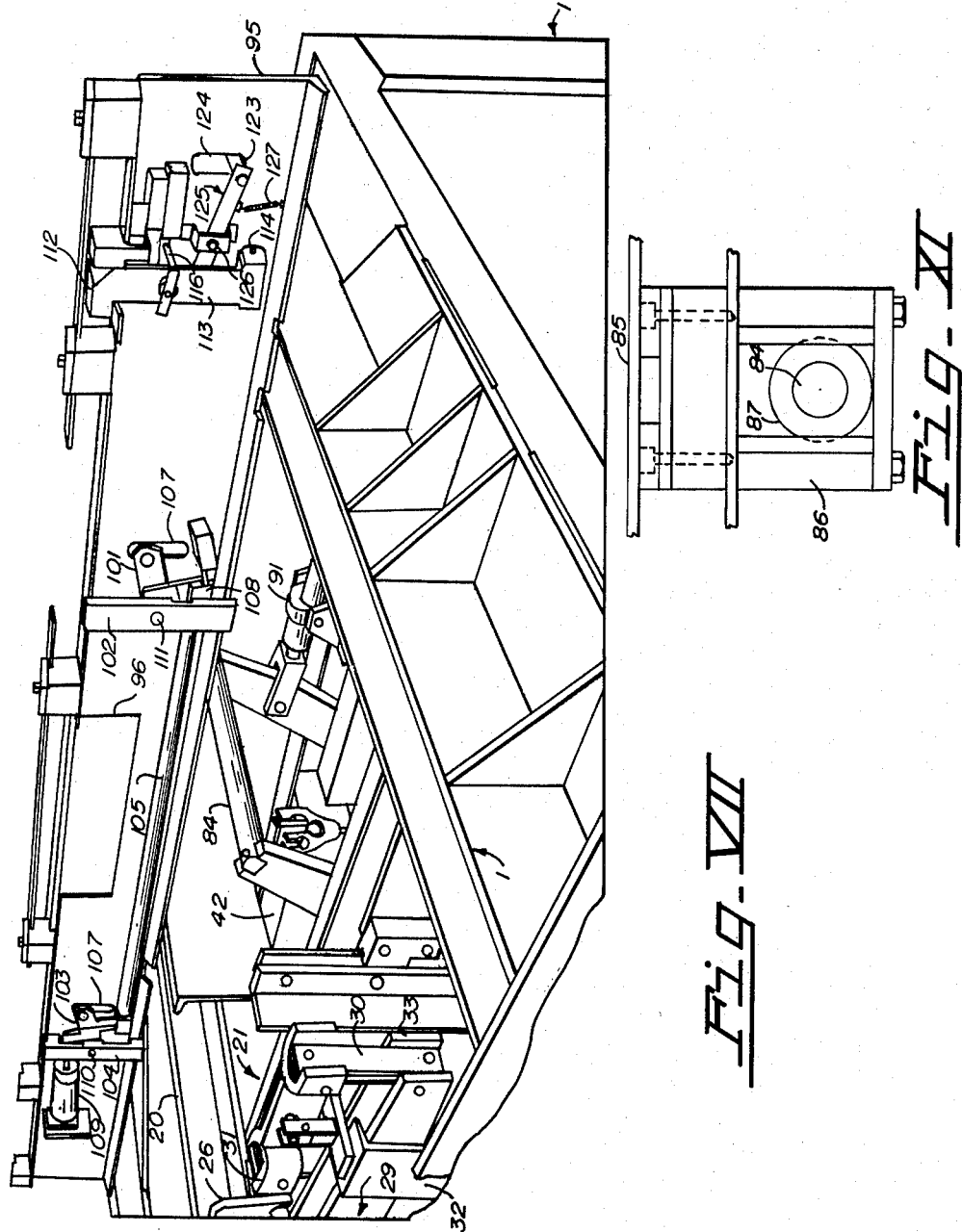
INVENTORS
GEORGE C. REISER
KENNETH F. WETZEL
BY
Marshall, Marshall & Yeasting
ATTORNEYS May 20, 1958 G. C. REISER ET AL 2,835,129
SPRING TESTING DEVICE
Filed Sept. 29, 1955 7 Sheets-Sheet 6
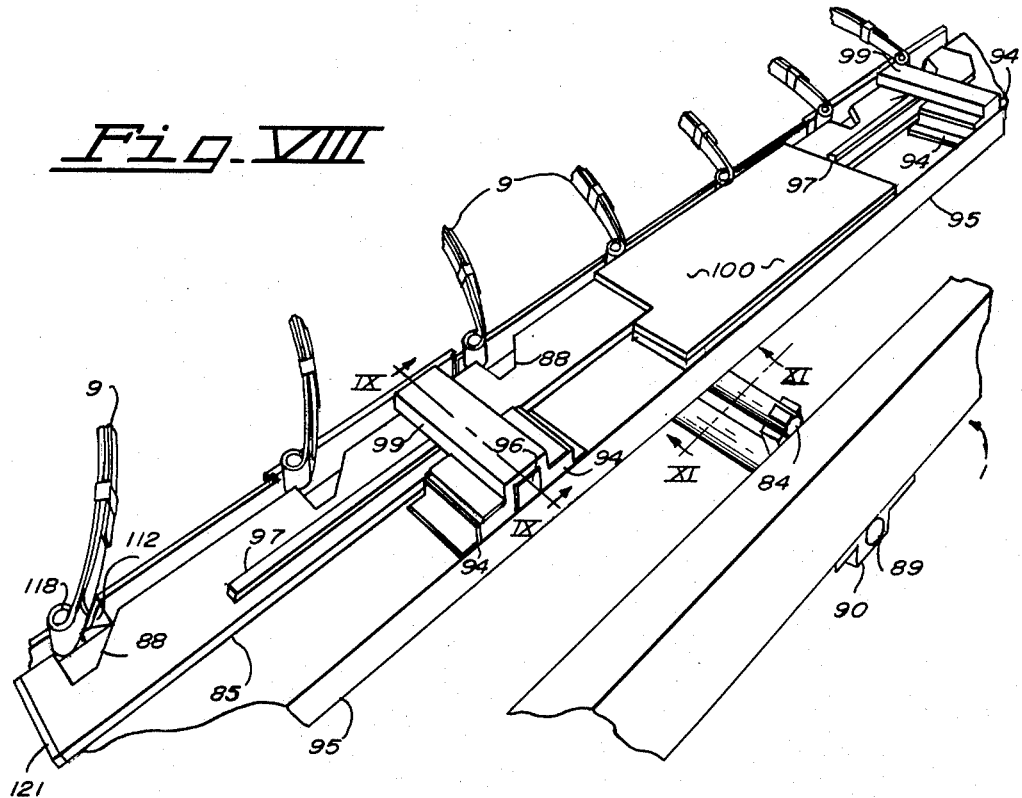
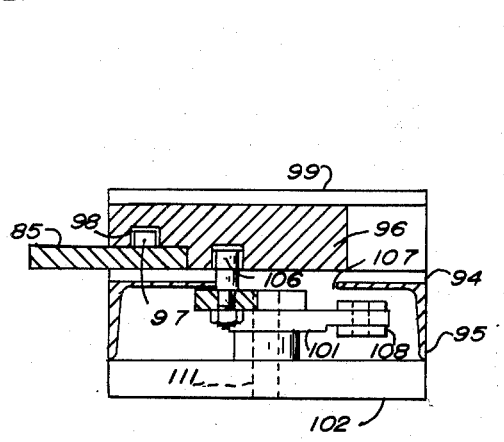
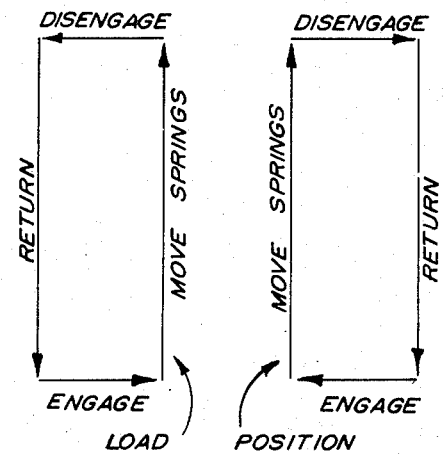
INVENTORS
GEORGE C. REISER
KENNETH F. WETZEL
BY
Marshall, Marshall & Yeasting
ATTORNEYS May 20, 1958 G. C. REISER ET AL 2,835,129
SPRING TESTING DEVICE
Filed Sept. 29, 1955 7 Sheets-Sheet 7
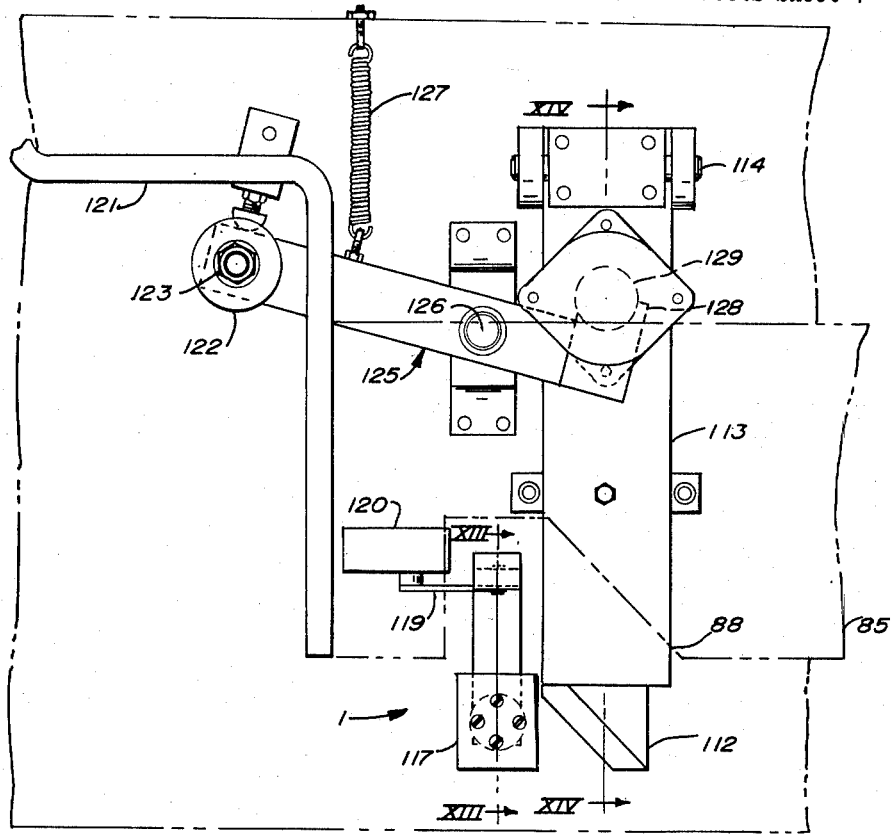
*Fig. XII*
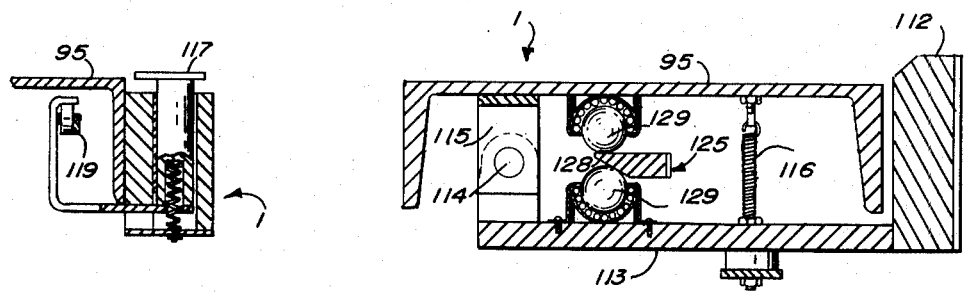
*Fig. XIII*  *Fig. XIV*
INVENTORS
GEORGE C. REISER
KENNETH F. WETZEL
BY
Marshall, Marshall & Geasting
ATTORNEYS United States Patent Office 2,835,129
Patented May 20, 1958

2,835,129

SPRING TESTING DEVICE

George C. Reiser and Kenneth F. Wetzel, Toledo, Ohio, assignors, by mesne assignments, to Toledo Scale Corporation, Toledo, Ohio, a corporation of Ohio Application September 29, 1955, Serial No. 537,364

10 Claims. (Cl. 73—161)

This invention relates to testing machines, and particularly to a device for testing the flexibility of leaf springs.

The testing device is used to uncover hidden defects in leaf springs and to make apparent characteristics of usable leaf springs, so that defective springs may be rejected or similar springs may be paired. When springs are employed in pairs or sets, it is often important that the resistance offered to any given degree of flexure or distortion be the same for each spring of the set. The amount of force required to bend to a given extent the springs employed in supporting automobile and truck bodies sometimes varies several hundred pounds, even though the springs be identical in appearance. When the springs on opposite sides of the body are not about equally resistant to flexure, unpleasant lateral movements occur in traveling over uneven roads. Such leaf springs are heavy and awkward to handle and, heretofore, machines for testing them have required a great deal of labor to load and unload. Furthermore, prior art machines have been very slow and could test relatively few springs in a day, even when operating at top speed.

The principal object of this invention is to provide a leaf spring testing device that requires little effort to load and unload.

Another object of the invention is to provide a leaf spring testing device which is operable at high speeds.

Still another object of the invention is to provide a leaf spring testing device that both tests and classifies springs and also performs the conditioning step in spring manufacture known as "breakdown" or "bulldozing."

A further object of the invention is to provide a leaf spring testing device that applies a horizontally directed force to the spring being tested, whereby the weight of the spring does not influence the measurement of the load force exerted by the spring.

Another object of the invention is to provide, in a leaf spring testing device, a conveyor for sequentially advancing leaf springs along a horizontally extending track through conditioning and testing stations and past a marking device.

Other objects and advantages will be apparent from the following description, in which reference is had to the accompanying drawings illustrating a preferred embodiment of the invention.

In the drawings:

Figure I is a simplified perspective view of the leaf spring testing device, parts being broken away to show interior details.

Figure II is an enlarged and detailed vertical sectional view taken substantially along the line II—II of Figure I.

Figure III is an enlarged and detailed vertical sectional view taken substantially along the line III—III of Figure I.

Figure IV is a simplified elevational view of part of the weighing mechanism used in the leaf spring testing device.

Figure V is a simplified and enlarged front elevational view of another part of the weighing mechanism used in the leaf spring testing device.

Figure VI is an enlarged and detailed perspective view of part of the leaf spring testing device shown in Figure I, parts being removed to expose interior details.

Figure VII is an enlarged and detailed perspective view of part of the leaf spring testing device shown in Figure I, parts being removed and other parts being tipped to expose interior details.

Figure VIII is an enlarged and detailed fragmentary perspective view of part of the leaf spring testing device shown in Figure I.

Figure IX is a vertical sectional view taken long the line IX—IX of Figure VIII.

Figure X is a diagram showing the four motions of the conveyor which sequentially advances the leaf springs in a generally horizontal direction through the testing device.

Figure XI is an enlarged fragmentary elevational view as seen from a position along the line XI—XI of Figure VIII.

Figure XII is an enlarged and detailed fragmentary plan view of the upper left hand corner of the leaf spring testing device shown in Figure I.

Figure XIII is a vertical sectional view taken along the line XIII—XIII of Figure XII.

Figure XIV is a vertical sectional view taken along the line XIV—XIV of Figure XII.

Referring to Figure I, the leaf spring testing device includes a frame 1 supporting four sectional horizontally extending tracks 2. End sections 3 and mid sections 4 of each of the tracks 2 are stationarily mounted on the frame 1 and elevator sections 5 and 6 of each of the tracks are mounted for up and down movement, as indicated by the vertical arrows in Figure I. Elevator sections 5 of each of the tracks 2 are located in a conditioning station 7 and elevator sections 6 of each of the tracks are located in a testing station 8.

Leaf springs 9 to be conditioned, tested, and classified are loaded by hand onto a horizontal plate 10 at the front of the frame 1 and sequentially advanced by a conveyor 11 along the sectioned tracks 2 through the stations 7 and 8 and past a marking device 12. To save time, while one leaf spring is being conditioned in the conditioning station 7, another may be tested in the testing station 8 and a third classified by being marked with one of four colors of paint as it moves past the marking device 12. The classified springs fall upon a discharge conveyor 13 on leaving the testing device.

The conditioning station 7 includes a bulldoze ram 14 which is advanced in a horizontal and longitudinal direction, as indicated by an arrow in Figure I, when a hydraulic cylinder 15 is operated, a hydraulic elevator cylinder which is not shown but which is similar to the cylinder 15 and that is mounted on the frame 1 in a vertical position to move the elevator sections 5 of each of the tracks 2 up and down, and a pair of fixed stops 16 mounted one at each side of the frame 1. The purpose of the conditioning station 7 is to coldwork the leaf springs to be tested in a step in spring manufacture known as "breakdown" or "bulldozing." The bulldozing or conditioning step is necessary so that consistent results may be obtained when the springs are tested.

In the operation of the condition station 7, the conveyor 11 moves a leaf spring 9 along the stationary front end section 3 of the tracks 2 and onto the elevator sections 5 of the tracks, the sections 3 and 5 being at the same elevation. The elevator sections 5 are lowered carrying the leaf spring 9 downwardly to a position in front of the fixed stops 16 and the bulldoze ram 14 is caused to advance and apply a conditioning load producing deformation of the spring to an extent in excess of the deformation at which the spring is to be tested. The bulldoze ram 14 is in its forward position in Figure I and is shown compressing the leaf spring 9 against the fixed stops 16. The stroke of the bulldoze ram 14 may be controlled by a positionable limit switch which is not shown but which may be mounted on a screw positioned by turning a handle 17 on the front of the frame 1, i. e., the hydraulic cylinder 15 may be controlled by the positionable limit switch so that it will stop and reverse the ram 14 after the ram trips the switch. Thus, by turning the handle 17, the length of the stroke of the ram 14 may be controlled to apply a suitable conditioning load. The conditioning load must always be greater than the load applied to the spring when it is tested, however, it may be varied to rework springs which fail to come up to specifications when they are tested. The reworking often produces springs which will pass the test the second time. After the leaf spring 9 is conditioned, the elevator sections 5 are raised to the level of the rest of the tracks 2 and the conveyor 11 moves the spring horizontally along the tracks toward the testing station 8.

The testing station 8 includes a testing ram 18 which is advanced in a horizontal and longitudinal direction, as indicated by an arrow in Figure I, when a hydraulic cylinder 19 is operated, a hydraulic elevator cylinder which is not shown but which is similar to the cylinder 19 and that is mounted on the frame 1 in a vertical position to move the elevator section 6 of each of the tracks 2 up and down, and a horizontally movable channel iron 20 that is part of lever mechanism 21 to be hereinafter described in detail. The purpose of the testing station 8 is to apply a horizontally directed force to the leaf spring which is sufficient to produce a predetermined deformation. The resistance offered by the spring to the deformation must be within specified limits. Force counter-balancing and indicating means which is operatively connected to the channel iron 20 for receiving and indicating the magnitude of the horizontally directed force exerted by the spring when it is being tested will be hereinafter described in detail.

In the operation of the testing station 8, the conveyor 11 moves a conditioned leaf spring 9 along the stationary mid sections 4 of the tracks 2 and onto the elevator sections 6 of the tracks, the sections 4 and 6 being at the same level. The elevator sections 6 are lowered carrying the conditioned spring 9 downwardly to a position in front of the channel iron 20 and the testing ram 18 is caused to advance and apply a horizontally directed force to the spring sufficient to produce a predetermined deformation. The testing ram 18 is in its forward position in Figure I. After the spring is tested, the elevator sections 6 are raised to the level of the rest of the tracks and the conveyor 11 moves the spring horizontally along the tracks past the marking device 12 and onto the discharge conveyor 13.

The channel iron 20 is part of the lever mechanism 21, shown in detail in Figures II, III, VI and VII, and is attached back to back to a second channel iron 22 (Figure III) which receives the ends of the leaf spring 9 that are pushed against it by the testing ram 18. The load receiving channels 20 and 22 are carried by a pair of links 23 (Figures II and III) one of which is rockably attached to each end of the channels. The lower ends of the links 23 are mounted on a shaft 24 the ends of which are mounted for rotation in bearing boxes 25 located one at each side of the frame 1. When a leaf spring 9 being tested is pushed against the channel iron 22, the shaft 24 maintains the channel iron in a position which is always perpendicular relative to the sides of the frame. As best shown in Figure VI, the channel iron 20 is also rockably attached to a link 26 which is carried on a short shaft 27 (Figure II) mounted for rotation in bearing boxes 28 supported by part of the frame 1. As viewed and indicated in Figure III, the axes of rotation of the shafts 24 and 27 and the rockable connections of the links 23 and 26 to the channels form a parallelogram ABCD which may assume different relative positions but which always maintains the load receiving channels 20 and 22 in a horizontal plane like analogous load platforms are maintained in ordinary weighting scales.

The short shaft 27 also serves as a fulcrum for the end of a lever 29 connected by a link 30 to a short 1:1 ratio lever 31 fulcrumed on a stand 32 supported by the frame 1. The left end 33 of the lever 29, as viewed in Figure III, moves downwardly under the influence of horizontally applied load on the channel 22, which load rocks the short shaft 27 counterclockwise, as viewed in Figure III, causing the right end 34 of the lever, as viewed in Figure III, to move upwardly. The purpose of the short 1:1 ratio lever 31 is merely to reverse the direction of the pull of the lever 29 for reasons of convenience in designing the overall lever system.

Upward pull of the lever 31 is transmitted through a vertically extending rod 35 to a long lever 36 fulcrumed on a stand 37 hanging from a plate 38 fixed to part of the frame 1. The long lever 36 extends from the stand 37, which is located near the middle of the testing device, at an angle to a position underneath a cabinet 39 (Figures I and IV) wherein it is connected in the usual way to a steelyard rod 40 extending upwardly within the cabinet, which steelyard rod 40 is pulled downwardly by the upward pull of the lever 31 transmitted through the rod 35. Part of the dead weight of the levers is counterbalanced by a pair of weights 41 hung from arms 42 projecting vertically from the shaft 24. One of the weights 41 may be seen in Figure III. The weights 41 also serve to seat the knife edges in the bearings of the lever system and pull a load counterbalancing spring 55 in a dynamic scale head 43, hereinafter described in detail, to an initial position.

One of the important features of the leaf spring testing device is that the tare weights of the leaf springs 9 need not be considered during the test. This is the result of applying a horizontally directed force to the leaf springs in the testing station 8. Only horizontally directed force causes the channels 20 and 22 to move forward so that the weight of the spring itself does not influence the measurement of the force exerted by the spring in opposition to the load force exerted by the testing ram 18.

Load forces are transmited through the steelyard rod 40 to a tare beam lever 44, fulcrumed on a stand 45, hung from the ceiling of the cabinet 39, and through a rod 46 that is connected to the tare beam lever 44 and that extends upwardly within the dynamic scale head 43. The upper end of the rod 46 is connected to a lever 47 fulcrumed within the dynamic scale head 43 (Figure V). The tare beam lever 44 is equipped with a pair of beams 48 upon which poises 49 are slidable.

Referring now to Figure V which illustrates dynamic load counterbalancing mechanism within the head 43, load forces from the load receiving channels 20 and 22 transmitted through the lever 47 are applied through a cone pivot 50 and stirrup bearing 51 to a flexible metallic tape 52 that is wrapped part way around and secured to a drum 53 mounted on an indicator shaft 54. The indicator shaft 54 is supported or journaled in suitable bearings so that it may turn freely without friction. Counterbalancing force to offset the load forces applied through the tape 52 is provided by the load counterbalancing spring 55 suspended by a threaded rod 56 from the upper end of a support bracket 57. The lower end of the spring 55 is connected through a fitting 58 to a flexible steel tape 59 that is wrapped part way around and secured to the drum 53. The rate of the spring 55, i. e., the increment of load per increment of extension, is adjusted by varying the number of active coils by screwing a fitting 60, forming part of the support rod 56, into the upper end of the spring 55. The initial pull of the spring, used to offset the constant force applied through the lever 47, is adjusted by raising or lowering the upper end of the spring by means of nuts 61 threaded onto the rod 56.

An indicator or freely movable member 62 that is mounted on the indicator shaft 54 and rigidly attached to the drum 53 carries on its upper end a thin, preferably metallic, chart 63 having a plurality of accurately spaced slots or perforations 64, one for each two divisions into which the weighing capacity of the testing device is divided. As the indicator shaft turns during a test, the perforated chart 63 cooperates with a light source and photoelectric cell assembly 65 to generate a series of electrical impulses equal in number to the number of divisions representing the magnitude of the horizontally directed force exerted by a leaf spring 9 when it is tested, i. e., the series of impulses have a number related to the movement of the load receiver or channels 20 and 22. There are twice as many divisions as there are slots because each slot that passes the photocell is counted once as the chart moves forward and once again as the chart moves back.

The light source and photoelectric cell assembly 65 comprises an ordinary light bulb and photoelectric cell which are not shown. The chart 63 moves between the bulb and the cell so that the slots 64 of the chart may alternately admit and obstruct the light beam from the bulb to the photocell. A plurality of adjusting screws 66 are provided for mounting the assembly 65 in position so that the light beam and chart slots 64 are accurately in register.

The indicator shaft 54 also carries a laterally directed latch arm for restraining the member 62 the end of which arm is fitted with an adjustable screw 68 cooperating with a cam 69 and stop screw 70. In the postion shown in Figure V with the testing device at rest, the indicator shaft 54 is turned counterclockwise to a position slightly behind zero so that slightly in excess of the net load applied through the flexible tape 52 is carried by the arm 67 and the cam 69. As the cam 69 rotates clockwise during a testing cycle the adjusting screw 68 drops off a corner 71 of the cam to permit an oscillation of the member 62, thus, permitting the dynamic lever and indicating system to move in response to the unbalance of force between the load and counterbalancing spring 55. Since the unbalanced load forces that were supported by the cam 69 are suddenly transferred to the load counterbalancing spring 55 the maximum extension of the spring under such load forces is twice the static deflection at which the system would come at rest. The speed at which the indicating system moves to the maximum spring extension and returns is determined by the relative magnitude of the inertia of the system and the rate or stiffness of the load counterbalancing spring 55.

The cam 69 is preferably driven by a chain or gear drive, indicated generally by a chain 72 running over a sprocket 73 on a shaft 74 carrying the cam 69 and a second sprocket 75 mounted on a shaft 76 of a motor 77. The speed of the motor is selected according to the operating speed of the indicating system so that as the arm 67 swings in response to a maximum load and the adjusting screw 68 moves upwardly after reaching its maximum downward deflection a raising or leading edge 78 of the cam 69 closely follows but does not quite touch the lower end of the screw 68 until it has nearly reached the locked position shown in Figure V.

The leading edge 78 of the cam 69 is an arc of a circle eccentric to the axis of rotation of the cam. If the radius of the circular arc, the maximum radius of the cam, and the position of the cam relative to the stroke of the arm 67 are properly selected, the leading edge of the cam 69 will very closely follow the return swing of the arm 67 without touching the screw 68 as a maximum load is being weighed.

A pair of cams 79 and 80 are also mounted on the shaft 74 to operate switch actuators 81, one of which is shown. The switch actuators 81 are arranged to operate switches one of which completes a circuit to the motor 77 to keep the motor running until the cam reaches the position shown and then to stop the motor at that position and hold it until a weigh signal is received through a circuit completed by the closing of a limit switch which is not shown but which is closed by the testing ram 18 in its forward position. The switch actuator for this function cooperates with the short cam 80. That one of the switch actuators 81 cooperating with the cam 79 serves to transmit a signal to an ordinary electronic counter 82 to reset the counter to zero as a testing cycle begins and before the indicator arm 67 is released. The electrical impulses generated by the light source and photoelectric cell assembly 65 may be counted and indicated by the electronic counter 82.

The locking screw 70 is set so that when the adjusting screw 68 of the arm 67 is pushed thereagainst a very slight clearance is left between the bottom end of the adjusting screw 68 and the constant radius portion of the cam 69. The starting position of the arm 67 and chart 63 is then adjusted by merely rotating the adjusting screw 68 thus varying its position relative to the arm 67. This second adjustment does not vary the clearance between the adjusting screw 68 and the cam 69.

The use of the dynamic load counterbalancing mechanism permits the time required for weighing or testing a leaf spring 9 to be as little as one second. Each increment of movement of the load receiver or channels 20 and 22 causes the generation of one impulse by the electrical signal generating means or light source and photoelectric cell assembly 65 which is adapted to generate a series of impulses as the load receiver moves. Electronic means or counter 82 responsive to the electrical signal counts and indicates the number of such impulses each time the freely movable member 62 is released and allowed to complete one oscillation or swing in response to the horizontally directed force exerted by a leaf spring 9 when it is being tested. The number of impulses as counted and indicated is used as a measure of the magnitude of the force exerted by the leaf spring. An amplified output from the electronic counter 82 may be used to condition the marking device 12 which includes four color code paint sprayers 83. Springs painted one color are rejected as being light and those painted a second color are rejected as being heavy, while those painted a third color are accepted as "O. K.—Light" and those painted a fourth color are accepted as "O. K.—Heavy."

The conveyor 11 for sequentially advancing the leaf springs 9 along the tracks 2 includes a pair of rockingly mounted transfer bars 84 one at each side of the frame 1 and a pair of plates 85 notched to receive the ends or eyes of the leaf springs. The pair of plates 85 are illustrated in Figure I and the right hand plate 85 is shown in detail in Figure VIII. The transfer bars 84 are shown in Figures VI, VII, and VIII. The plates 85 are mounted to slide in a transverse direction on the bars 84 by means of blocks 86 fixed one to each plate, one of which blocks is shown in Figure XI, there being a bar 84 rockably attached to each block through self aligning bearings 87. Notches 88 in the plates 85 are paired so that notches in one plate are directly opposite corresponding notches in the other plate.

The transfer bars 84 are mounted on a shaft 89 extending transversely across the frame 1 and mounted for rotation in bearings 90 one of which is mounted at each side of the frame and one of which is shown in Figures VI and VIII. Each of the transfer bars 84 is driven forward and back by a hydraulic cylinder 91 mounted on a cross member 92 of the frame 1. The transfer bars 84, attached to the plates 85 by means of the blocks 86, drive the plates 85 forward and back in a longitudinal direction. The purpose of the common mounting of the bars 84 on the shaft 89 is to insure that the bars always move in unison so that one of the plates 85 does not get ahead of the other.

Means are provided for sliding the plates 85 on the transfer bars 84 away from the leaf spring 9 after a forward stroke of the transfer bars to disengage the plates from the springs and for sliding the plates 85 on the transfer bars toward the springs after a back stroke of the transfer bars to engage the plates with the springs. The complete four-movement cycle is indicated by the arrows in the diagram of Figure X. As indicated by the diagram, the notches 88 of the plates 85 move the leaf springs forwardly along the tracks 2 in one step, the plates 85 then move away from the springs to disengage the notches from the springs, the return motion of the transfer bars 84 brings the notches 88 opposite to their original locations, and then the plates 85 move toward the springs to engage the notches with the springs. The complete cycle shifts all of the leaf springs 9 in the testing device one step along the tracks 2, the last spring sliding off onto the discharge conveyor 13.

The plates 85 also slide along the upper surfaces of wear plates 93 and 94 fixed to the tops of supporting members 95 of the frame 1. Figure VI shows the upper surfaces of part of one of the supporting members 95. The plate 85 has been removed from the testing device as illustrated in Figure VI to better show the upper surfaces of the member 95. The member 95 is tipped on its side, as illustrated in Figure VII, to reveal mechanism located on its underneath side. The plate 85 and the member is shown in assembled and normal position in Figure VIII. The connections between the transfer bars 84 and the plates 85 are made through openings 96 in the members 95. Both of the plates 85 and the supporting members 95 are identical so that the following description of one plate and one member is applicable to each respectively.

There are two pairs of wear plates 94 fixed to the top of the member 95. The plates 94 of each pair are closely spaced and a slide 96 is located between the plates of each pair and bears on the upper surface of the member 95. A pair of longitudinally extending guides 97 are fixed to the upper surface of the plate 85 and cooperate with slots 98 (Figure IX) in each of the slides 96, which slides are held against the member 95 by housings 99 attached to the plates 94. The guides 97 and the slots 98 are loosely fitted so that the transfer bars 84 may shift the plates 85 forward and back without being obstructed by the slides 96. To guard against the transfer bars 84 lifting the plates 85 upwardly hold down elements 100 (Figure VIII) are attached to blocks 101 (Figure VI) which are fixed to the members 95. Normally the elements 100 do not contact the plates 85.

The means for transversely sliding each of the plates 85 on the transfer bars 84 include a bell crank 101 pivotally mounted on a bridge 102 across the bottom of the member 95 (see the member 95 in Figure VII which is in a tipped position) and a T-shaped member 103 pivotally mounted on a second bridge 104 across the bottom of the member 95. A rod 105 connects the bell crank 101 and the T-shaped member 103. Rollers 106, one on the bell crank 101 and one on the T-shaped member 103, extend upwardly through holes 107 in the member 95 and cooperate with the slides 96. The rollers 106 are alike and are similarly connected to the slides 96 so that only one need be shown in detail (Figure IX). Figure IX illustrates the bell crank 101 and its roller 106, the rod 105 being connected to the bell crank by means of a fitting 108. A hydraulic cylinder 109, attached to the bottom of the member 95, is used to pivot the T-shaped member 103 about its pivot point 110 and the pivoting T-shaped member, connected to the bell crank 101 through the rod 105, causes the bell crank to pivot about its pivot point 111. It is to be understood that each of the plates 85 is equipped with separate sliding mechanism, the foregoing description of the mechanism for driving one of the plates being applicable to corresponding mechanism for driving the other.

Pivoting of the T-shaped member 103 and of the bell crank 101 causes the rollers 106 to drive the slides 96 toward or away from the leaf springs 9 on the tracks 2. The moving slides 96 either push or pull the plate 85, depending upon the direction of movement, into engagement or out of engagement respectively with the ends of the leaf springs 9. As shown in Figure IX, the guides 97 on the plates 85 are free to move longitudinally of the testing device in the slots 98 but when the slides 96 move transversely of the testing device the sides of the slots 98 engage the guides 97 and cause the plate 85 to move along with the slides 96.

The operator of the testing device must load the leaf springs 9 into the device properly or else the conveyor plates 85 are not permitted to move forwardly by means of rockably mounted stops 112 one of which is mounted at the left side of the frame 1 (Figures XII and XIV) and the other of which is mounted at the right side of the frame (Figures VII and VIII). The stops 112 are each carried on the end of a leg 113 pivoted at 114 to a bracket 115 hanging from a member 95 of the frame 1. Springs 116 constantly pull the legs 113 toward the members 95.

When the operator properly loads a leaf spring 9 into the testing device, the eyes of the leaf spring each press upon spring lifted pads 117 one of which is located underneath an eye 118 of a leaf spring 9 shown in Figure VIII and the other of which is shown in Figures XII and XIII. Downward movement of the pads 117 under the weight of the leaf spring 9 causes arms 119 to trip limit switches 120 one of which is shown in Figure XII. Both of the switches 120 must be closed before the hydraulic cylinders 109 will operate. Operation of the cylinders 109 moves the plates 85 toward the stops 112 causing hooked arms 121 fixed to the ends of the plates to contact rollers 122 carried on the ends of fingers 123 extending downwardly through slots 124, one of which is shown in Figure VII, in the members 95 of the frame 1. The fingers 123 are each mounted on the end of the pivotally mounted wedge 125 which pivots about its pivot point 126 when the arms 121 contact the rollers 122. When the arms 121 are not in contact with the rollers 122, a return spring 127 pulls the wedge 125 back to the position shown in Figure XII. Pivoting of the wedge 125, driven by an arm 121, drives a free end 128 of the wedge between a pair of balls 129 one of which is roller mounted on the member 95 and the other of which is roller mounted on the leg 113 to pivot a stop 112 about its pivot point 114 out of the path of a plate 85. It is to be understood that the stop and unlocking mechanism for each of the plates 85 are identical.

When the stops 112 are pivoted out of the path of the plates 85, the plates 85 are free to be moved in the directions indicated by the arrows in the diagram of Figure X. The complete four-movement cycle of the plates shifts all of the leaf springs 9 one step along the tracks 2, the last spring sliding off onto the discharge conveyor 13. The leaf springs are sequentially advanced along the tracks 2 through the conditioning station 7 and the testing station 8. While one spring is being conditioned in the conditioning station another may be tested in the testing station. Each increment of movement of the load receiver or channels 20 and 22 in the testing station 8 causes the generation of one electrical impulse by the light source and photoelectric cell assembly 65 in the dynamic head 43. The counter 82, responsive to the electrical signal, counts and indicates the number of such impulses which is a measure of the magnitude of the force exerted by the leaf spring being tested. An amplified output from the counter 82 may be used to condition the marking device 12 which sprays the tested spring with one of four colors of paint to indicate into which classification the spring falls according to the strength of the spring measured at a predetermined deformation.

The embodiment of the invention herein shown and described is to be regarded as illustrative only and it is to be understood that the invention is susceptible to variation, modification, and change within the spirit and scope of the subjoined claims.

Having described the invention we claim:

1. A leaf spring testing device that comprises a conditioning station, a testing station, a conveyor for moving a leaf spring along a generally horizontal path to the conditioning station and from the conditioning station to the testing station, means for applying a load to the leaf spring when it is in the conditioning station causing deformation of the spring in excess of the deformation at which the leaf spring is to be tested, means for applying a horizontally directed force to the spring when it is in the testing station sufficient to produce a predetermined deformation in the spring, and a force counterbalancing and indicating means for receiving and indicating the magnitude of the horizontally directed force exerted by the spring when it is being tested.

2. A leaf spring testing device according to claim 1 wherein the conveyor includes a rockingly mounted transfer bar, a plate that is notched to receive the ends of leaf springs and that is mounted to slide in a transverse direction on the bar, and means for sliding the plate on the bar, the transfer bar driving the plate forward and back in a longitudinal direction and said means for sliding driving the plate away from the leaf spring after a forward stroke of the transfer bar to disengage the plate from the spring and said means for sliding driving the plate toward the leaf spring after a back stroke of the transfer bar to engage the plate with the spring.

3. A testing device according to claim 2 wherein the means for sliding the plate on the transfer bar comprises a slide that cooperates with the plate and that is adapted to shift the plate in transverse directions while nevertheless permitting free movement of the plate in longitudinal directions.

4. A leaf spring testing device according to claim 1 wherein the conveyor includes a rockingly mounted transfer bar, a plate that is notched to receive the ends of leaf springs and that is mounted to slide in a transverse direction on the bar, and means for sliding the plate on the bar, the transfer bar driving the plate forward and back in a longitudinal direction and the means for sliding driving the plate away from the leaf spring after a forward stroke of the transfer bar to disengage the plate from the spring and the means for sliding driving the plate toward the spring after a back stroke of the transfer bar to engage the plate with the spring, and wherein a safety device is provided for the conveyor which safety device includes a pivotally mounted stop for preventing longitudinal forward movement of the plate if a leaf spring is not properly loaded into the testing device and unlocking means operated by the plate for pivoting the stop out of the path of the plate when a leaf spring is properly loaded into the testing device.

5. The combination according to claim 4 wherein the means for sliding the plate on the transfer bar comprises a slide that cooperates with the plate and that is adapted to shift the plate in transverse directions while nevertheless permitting free movement of the plate in longitudinal directions.

6. The combination according to claim 4 wherein the unlocking means comprises a pivotally mounted wedge and that is driven by the plate to pivot the stop out of the path of the plate.

7. The combination according to claim 6 wherein the means for sliding the plate on the transfer bar comprises a slide that cooperates with the plate and that is adapted to shift the plate in transverse directions while nevertheless permitting free movement of the plate in longitudinal directions.

8. A leaf spring testing device that comprises a freely movable member, a counterbalancing spring connected to the member and urging it in a first direction, a conditioning station, a testing station, a conveyor for moving a leaf spring along a generally horizontal path to the conditioning station and from the conditioning station to the testing station, means for applying a load to the leaf spring when it is in the conditioning station causing deformation of the leaf spring in excess of the deformation at which the spring is to be tested, means for applying a horizontally directed force to the leaf spring when it is in the testing station sufficient to produce a predetermined deformation in the spring, means for applying the reaction force of the leaf spring under test to the freely movable member in opposition to the counterbalancing spring, latch means for restraining the member, means for withdrawing the latch means to permit an oscillation of the member, and electronic means for measuring and indicating the magnitude of movement of the movable member.

9. A leaf spring testing device that comprises a sectioned horizontally extending track, a conditioning station, a testing station, there being a section of the track in each of the stations, a conveyor for moving a leaf spring along the track onto the section of the track in the conditioning station, means for lowering the section of the track in the conditioning station and the leaf spring carried thereby from the conveyor, means for applying a conditioning load to the leaf spring in its lowered position, the means for lowering the section of the track in the conditioning station returning the section and the conditioned leaf spring to the conveyor for movement of the spring along a generally horizontal path onto the section of the track in the testing station, means for lowering the section of the track in the testing station and the conditioned leaf spring carried thereby from the conveyor, means for applying a horizontally directed force to the leaf spring in its lowered position sufficient to produce a predetermined deformation in the spring, the means for lowering the section of the track in the testing station returning the section and the tested spring to the conveyor for movement of the spring along a generally horizontal path, and a force counterbalancing and indicating means for receiving and indicating the magnitude of the horizontally directed force exerted by the leaf spring when it is being tested.

10. A leaf spring testing device that comprises a conditioning station, a testing station, means for moving leaf springs along a generally horizontal path to the conditioning station and from the conditioning station to the testing station, means for applying a load to a leaf spring when it is in the conditioning station causing deformation of the spring in excess of the deformation at which the leaf spring is to be tested, means for applying a horizontally directed force to a spring when it is in the testing station sufficient to produce a predetermined deformation in the spring, one spring being conditioned in the conditioning station while another spring is being tested in the testing station, and a force counterbalancing and indicating means for receiving and indicating the magnitude of the horizontally directed force exerted by a spring when it is being tested.

References Cited in the file of this patent
UNITED STATES PATENTS

| | | |
|---|---|---|
| 1,091,219 | Harvey | Mar. 24, 1914 |
| 1,308,410 | Girl | July 1, 1919 |
| 2,409,265 | Fenton | Oct. 15, 1946 |